Jan. 14, 1969  G. C. CORIJNEN  3,422,400
FERROELECTRIC STORAGE MEANS
Filed Nov. 5, 1964  Sheet 1 of 2
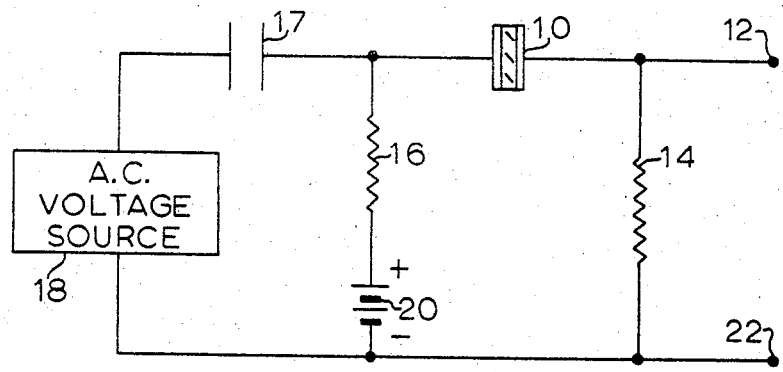
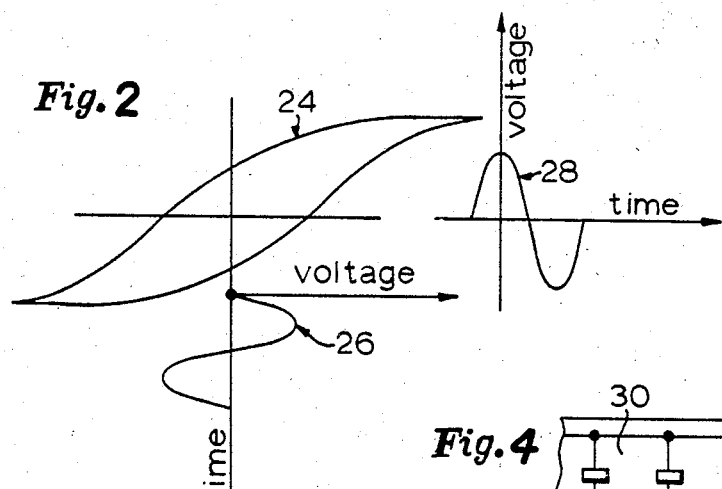
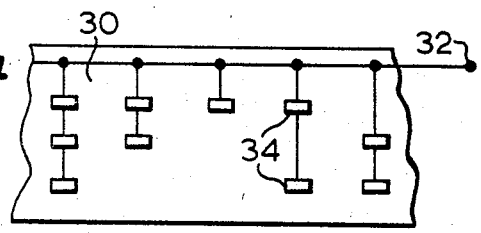
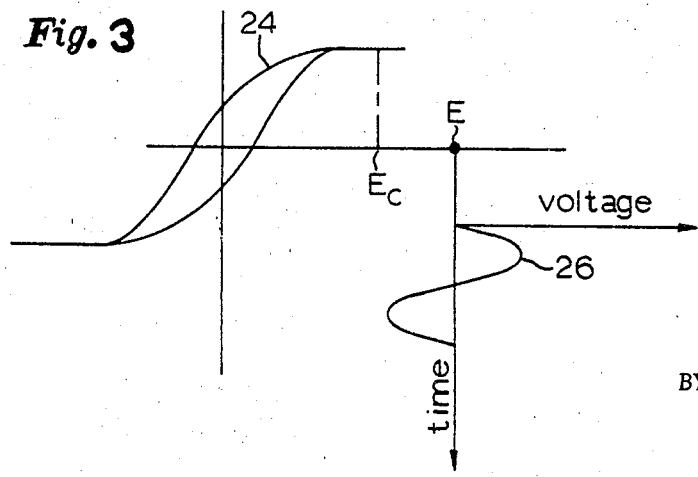
INVENTOR.
GUIDO C. CORIJNEN
BY
Vincent L. Carney
ATTORNEY Jan. 14, 1969  G. C. CORIJNEN  3,422,400
FERROELECTRIC STORAGE MEANS Filed Nov. 5, 1964  Sheet 2 of 2

INVENTOR.
GUIDO C. CORIJNEN
BY
ATTORNEY

United States Patent Office 3,422,400
Patented Jan. 14, 1969

3,422,400
FERROELECTRIC STORAGE MEANS
Guido C. Corijnen, Royal Oak, Mich., assignor to Burroughs Corporation, Detroit, Mich., a corporation of Michigan
Filed Nov. 5, 1964, Ser. No. 409,238
U.S. Cl. 340—173.2
Int. Cl. G11b 9/02
7 Claims This invention relates to sensing devices, and more particularly relates to apparatus for determining the position of predetermined indicia.

It is frequently desirable to record indicia and to later automatically determine the location of this indicia. This is commonly done in memories for electronic computers. Another application of this mechanism is in position determining devices. In such devices indicia may be recorded along the moving body and later the position of the body determined by detecting the recorded indicia. In such applications it is desirable that the indicia itself be simple and inexpensive since it will be duplicated many times. Accordingly it is an object of this invention to provide an improved sensing device.

It is a further object of this invention to provide a sensing device which is simple and economical.

It is a further object of this invention to provide an economical system in which a non-linear sensing device is used to detect information that is stored in the form of electric charges.

In accordance with the above objects a movable tape composed of a dielectric material having storage means or conductors spaced along its length is attached to a carrier for a printing mechanism. The conductors in this tape are electrically connected to a source of high voltage. A ferroelectric capacitor, fixed in position, is placed in juxtaposition with this tape so as to be biased to saturation by the electric field from the charged conductors in the tape when they are adjacent to the ferroelectric capacitor. An AC (alternating current) sampling voltage is applied to the ferroelectric capacitor to determine if it is saturated. In this way the position of the conductors which are imbedded in the tape with respect to the ferroelectric capacitor is determined.

The invention and the above noted and other features of it will be understood more clearly and fully from the following detailed description considered with reference to the accompanying drawings in which:

FIG. 1 is an equivalent circuit diagram of an embodiment of the invention;

FIG. 2 is a graph illustrating one state of bias of the sensing device used in an embodiment of the invention;

FIG. 3 is a graph illustrating a second state of bias of the sensing device used in an embodiment of the invention;

FIG. 4 is a plane view of a portion of an embodiment of the invention;

Figure 5:
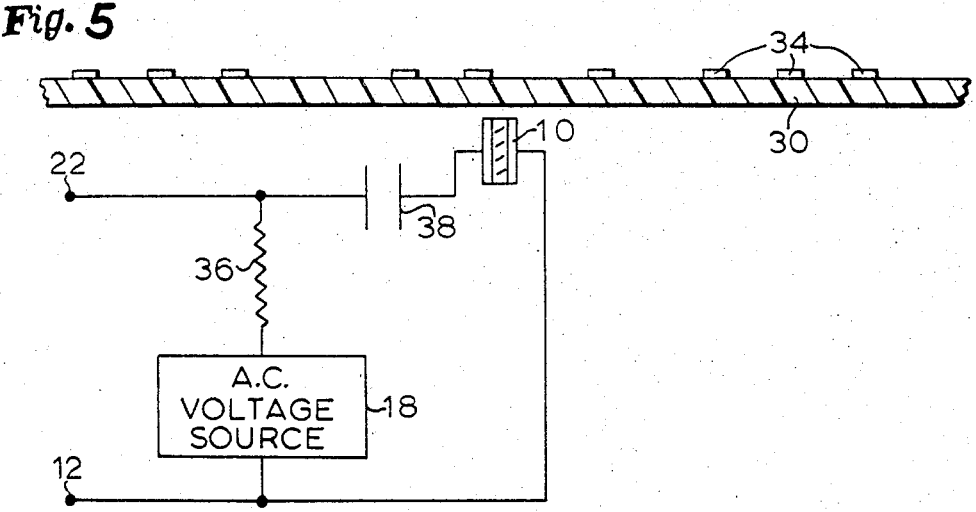
FIG. 5 is a front view of an embodiment of the invention.

In FIG. 1 an equivalent circuit diagram of an embodiment of the invention is shown, having an electric energy sensing element, preferably a saturable bistable impedance element such as a ferroelectric capacitor 10 with one plate directly connected to an output terminal 12 and to one end of a resistor 14. The other plate of the ferroelectric capacitor 10 is electrically connected to one end of a resistor 16 and to one terminal of the AC voltage source 18 through a coupling capacitor 17. A source of DC voltage 20 has its positive terminal electrically connected to the other end of the resistor 16 and has its negative terminal electrically connected to the other terminal of the AC voltage source 18, to the other end of the resistor 14, and to the output terminal 22.

The ferroelectric capacitor 10 may contain a dielectric material of barium titanate or any other ferrolelectric material prepared so as to have a square loop hysteresis curve. The resistor 14 represents the output impedance of the circuit and the resistor 16 represents its input impedance. The source of DC (direct current) voltage 20 represents an external DC field applied to the ferroelectric capacitor 10. If the DC voltage 20 is very low the output from the AC voltage source 18 appears at the output terminals 12 and 22; if the DC voltage 20 is large no voltage appears at the output terminals 12 and 22.

In FIG. 2 a graph is shown illustrating the operation of the equivolent circuit of FIG. 1 when the source of DC voltage 20 is negligible. A curve 24 having abscissae of electric field intensity and having ordinates of electrostatic charges is shown. A second curve 26 having abscissae of voltage and ordinates of time is shown directly under the curve 24 and represents the voltage output from the AC source 18 shown in FIG. 1. A third curve 28 is shown to the right of the curve 24 and has abscissae of time and ordinates of voltage. This curve represents the output at the terminals 12 and 22 when the DC voltage source 20 is negligible.

The curve 24 is the hysteresis curve for barium titanate (BaTiO$_3$). As the AC voltage 26 from the voltage source 18 is impressed across the capacitor 10, the electrostatic charge stored by the ferroelectric capacitor 10 changes in the manner shown by the curve 24. Thus at the time in which the voltage shown by the curve 26 crosses its ordinate indicating a minimum electric field intensity the electrotsatic charge stored by the capacitor 10 is also at a minimum. As the voltage shown by the curve 26 increases sinusoidally the electrostatic charge stored by the capacitor 24 increases non-sinusoidally and continues to increase while the voltage across it is positve until it saturates. As the voltage impressed across it decreases sinusoidally, the electrostatic charge decreases non-sinusoidally. This non-linear behavior causes the ratio of the stored charge in the capacitor to the voltage across the capacitor to behave like a voltage-dependent variable quantity. This quantity is defined as capacitance. Therefore the capacitance varies with the applied potential.

As long as the capacitor 10 is not saturated, the voltage 26 from the source 18 is coupled through it to the output terminals 12 and 22. The graph in FIG. 2 illustrates the behavior of the circuit shown in FIG. 1 when the voltage source 20 is so low that the capacitor 10 is never saturated by the voltage 26 from the AC voltage source 18. Therefore the voltage 28 always appears across the output terminals 12 and 22.

In FIG. 3 a graph is shown illustrating the operation of the circuit of FIG. 1 when the DC voltage source 20 is so large that the capacitor 10 is always saturated. A hysteresis curve 24 and a curve for the input AC voltage 26 are again shown. The axis for the AC voltage 26 has been offset along the abscissa of the hysteresis curve 24 by an amount E representing the magnitude of the electric field intensity from the DC source 20. This magnitude E is greater than the saturation field $E_c$ of the capacitor 10. Consequently the AC voltage shown by the curve 26 does not change the electrostatic charge stored by the capacitor 10 and therefore the AC voltage source 18 is not coupled to the output terminals 12 and 22. In other words, the capacitance of the capacitor 10 is negligible while it is saturated causing the AC impedance of the capacitor to be so large as to decouple the source 18 from the output terminals 12 and 22.

In FIG. 4 a top view of an embodiment of the invention is shown having a tape of dielectric material 30, a source of DC potential 32, and a plurality of metallic plates 34 plated on the top surface of the dielectric tape 30 and being electrically connected to the source of positive voltage 32 such that each of the plates carries an electrostatic charge. The conductive plates 34 provide the electric field intensity illustrated by the DC voltage source 20 shown in the equivalent circuit diagram of FIG. 1. The dielectric tape 30 insulates these plates from the ferroelectric capacitor shown as 10 in FIG. 1.

In FIG. 5 a front view of an embodiment of the invention is shown having the insulating tape 30 containing the metal plates 34 positioned above and in juxtaposition with the ferroelectric capacitor 10. One plate of the ferroelectric capacitor 10 is coupled to the output terminal 22 and to one end of the resistor 36 through a coupling capacitor 38; the other plate of the capacitor 10 is electrically connected to one of the terminals of the AC voltage source 18 and to the output terminal 12. The other output terminal of the AC voltage source 18 is electrically connected to the other end of the resistor 36.

As the tape 30 moves in a plane parallel to the ferroelectric capacitor 10, successive ones of the charged metallic conductors 34 pass close to the ferroelectric capacitor 10. The distance between the ferroelectric capacitor 10 and the bottom side of the tape 30 is not more than .0001". It may be a frictional contact if desirable.

When any one of the conducting plates 34 is directly opposite to the capacitor 10, the latter is biased into saturation. The output voltage from he AC source 18 is then coupled to the output terminals 22 and 12 since the capacitor 10 has a high impedance. As the conductive plates 34 move away from the capacitor 10 the bias on the capacitor 10 is reduced and the AC voltage is shorted through the low impedance of the capacitor and does not appear across the output terminals 22 and 12. It is noted that this operation is the inverse of that illustrated by FIG. 1 since the capacitor 10 is in parallel with the load rather than in series with it. Several capacitors 10 may be placed side by side in a direction orthogonal to the direction of the tape 30 so as to sense several columns of metallic conductors in a parallel operation.

Figure 6:
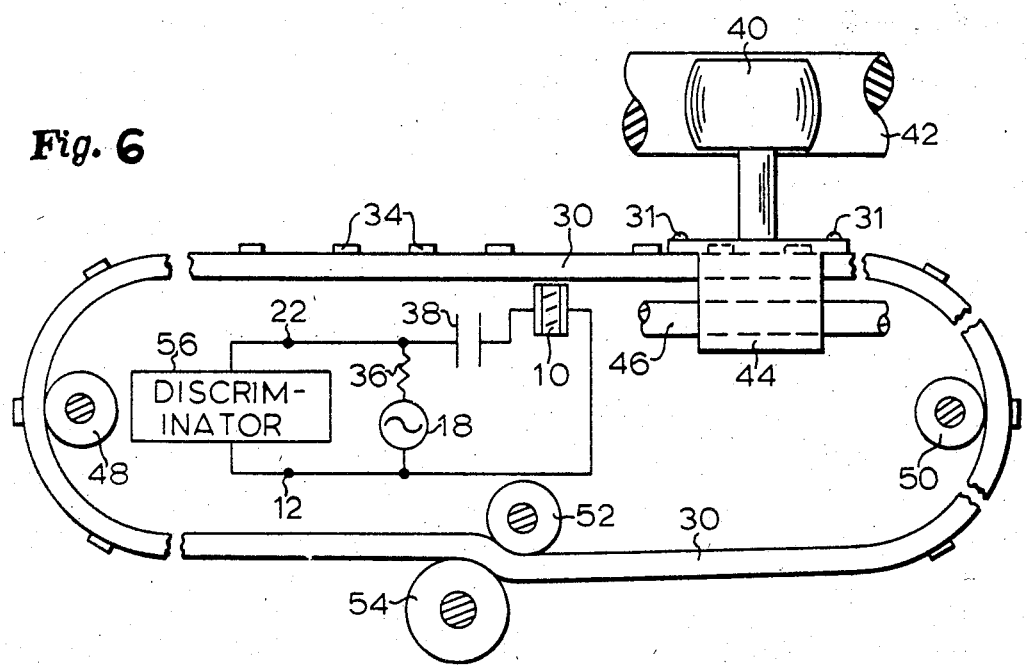
FIG. 6 is a front view of an embodiment of the invention as applied to a printing mechanism.

In FIG. 6 a front view of an embodiment of the invention is shown including the manner in which it may be applied to the operation of a serial printer. A printing head 40 is driven so as to move along a platen 42. The printing head 40 is intended to print at predetermined points as it moves along the platen 42. It is desirable to sonse the position of the printing head 40 with respect to the platen 42 so as to determine when to activate the printing element.

A sliding member 44 (carrier) is rigidly connected to the printing head 40 and to the tape 30 by two rivets 32 and 34 and adapted to be driven along a shaft 46 so as to move with the printing head 40. As the sliding member 44 moves, the tape 30 is moved with it, passing around the four idler rollers 48, 50, 52 and 54 which hold it in position. The metallic conductors 34 are carried with the tape so as to pass in a path adjacent to the capacitor 10. The capacitor 10 is electrically connected to the output terminal 22 through the coupling capacitor 38 and to one output terminal of the AC voltage source 18 through the coupling capacitor 38 and the resistor 36 as described in connection with FIG. 5. The other plate of the ferroelectric capacitor 10 similarly is electrically connected to the output terminal 12 and to the other terminal of the AC voltage source 18. An AC discriminator 56 is connected across the terminals 22 and 12.

It can be seen that, as the printing head 40 is moved with respect to the platen 42, its position is detected at periodic intervals by the presence of the AC voltage output at terminals 12 and 22. In this way the printing element is automatically activated at predetermined positions, controlled by the location of the metallic conductors 34 on the tape 30. This provides a simple and economical form of storing indicia and provides accuracy at low cost since the stored indicia is relatively simple and cheap. It is versatile and can be adapted to a number of applications.

Obviously many modifications and variations in the invention are possible in the light of the above teachings. It is therefore to be understood that within the scope of the appended claims the invention may be practiced otherwise than as specifically described.

What is claimed is:
1. A combination comprising:
storage means for storing information in the form of a pattern of electric energy at predetermined locations;
readout means for detecting the presence of said electrical energy at any of said predetermined locations;
said readout means including a ferroelectric capacitor for changing one of its characteristics in the presence of said energy,
said readout means further including a sampling means for detecting impedance of said ferroelectric capacitor,
said sampling means comprising a source of alternating current having an amplitude insufficient by itself to saturate said ferroelectric capacitor, whereby said ferroelectric capacitor couples and decouples said alternating current to the output terminals of said readout means under the control of said pattern of electrical energy which is capable of saturating said ferroelectric capacitor.

2. A combination comprising:
a source of alternating current,
a saturable bistable impedance element electrically connected to said source of alternating current and changeable upon saturation thereof from one state to an opposite state,
a discriminator electrically connected to said impedance element and activated by said alternating current by and upon the changing of said impedance element from one of said states to the other, and
a plurality of spaced apart members movable successively past said impedance element and operable to successively change the state of said impedance element.

3. A combination comprising:
a saturable bistable impedance element changeable upon saturation thereof from one state to an opposite state,
a source of alternating current electrically connected to said impedance element and having an amplitude insufficient by itself to saturate said impedance element,
a discriminator electrically connected to said source and activated by and upon the changing of said impedance element from one of said states to the other, and
a plurality of spaced apart members movable successively past said impedance element and successively changing the state of said impedance element.

4. A combination comprising:
a source of alternating current,
a saturable bistable impedance element electrically connected in a circuit with said source of alternating current,
a discriminator electrically connected in another circuit to said source of alternating current and energized by the alternating current by and upon saturation of said element, and
a plurality of spaced apart direct current energized elements movable together along a path proximate to said impedance element to successively saturate the latter.

5. A combination as defined by claim 4 wherein the direct current energized elements are carried by a dielectric member between said elements and said saturable bistable impedance element.

6. Apparatus for automatically determining the position of a movable body, comprising:
- an insulating member rigidly attached to said movable body;
- said insulating member having a plurality of conductive bodies, adapted to be electrically connected to a source of potential upon a first of its surfaces;
- a ferroelectric capacitor positioned in juxtaposition to the other surface of said insulating member, whereby said conductive bodies are moved in a position adjacent to said ferroelectric capacitor as said movable body moves;
- the plates of said ferroelectric capacitor being adapted to be connected to a source of alternating current; and
- discriminating means, electrically connected across the plates of said ferroelectric capacitor, for detecting the presence and absence of an AC voltage.

7. Apparatus for automatically determining the location of a printing head with respect to a platen comprising:
- a sliding member rigidly attached to said printing head and adapted to be driven so as to move said printing head across said platen;
- a continuous insulating belt having a plurality of conductive elements deposited upon its outer surface in a plurality of continuous columns parallel to longitudinal axes of said belt;
- said plurality of conductive bodies each being adapted to be electrically connected to a source of DC potential;
- said continuous insulating tape being rigidly attached to said sliding member and being supported by a plurality of idler rollers so as to transport said conductive bodies as said sliding member moves across said platen;
- a plurality of ferroelectric capacitors each placed in juxtaposition to a different column of said conductive bodies and being in frictional contact with the opposite side of said continuous insulating belt from said conductive bodies;
- the plates of each of said ferroelectric capacitors being adapted to be connected to a source of AC potential; and
- a plurality of discriminating means, each being electrically connected across a different one of said plurality of ferroelectric capacitors, for detecting the presence and absence of an AC potential.

References Cited
UNITED STATES PATENTS 3,179,926  4/1965  Wolfe _____ 340—173.2

TERRELL W. FEARS, *Primary Examiner.*

U.S. Cl. X.R.

235—61.11